United States Patent
Soneoka

(10) Patent No.: US 7,403,312 B2
(45) Date of Patent: Jul. 22, 2008

(54) COMMUNICATION TERMINAL DEVICE

(75) Inventor: Taku Soneoka, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1086 days.

(21) Appl. No.: 10/254,741

(22) Filed: Sep. 25, 2002

(65) Prior Publication Data

US 2003/0076541 A1 Apr. 24, 2003

(30) Foreign Application Priority Data

Oct. 18, 2001 (JP) ............................. 2001-320359

(51) Int. Cl.
*H04N 1/04* (2006.01)

(52) U.S. Cl. ............... 358/474; 358/1.15; 358/402; 358/403; 358/442; 379/100.01

(58) Field of Classification Search ........... 358/400, 358/1.15, 402, 442, 404, 405, 435, 474, 403; 399/45, 82; 340/825.52; 370/449; 379/100.08
See application file for complete search history.

(56) References Cited

U.S. PATENT DOCUMENTS

| | | | | |
|---|---|---|---|---|
| 4,807,276 A | * | 2/1989 | Okabe | ..................... 379/93.08 |
| 5,526,423 A | * | 6/1996 | Ohuchi et al. | ............. 379/88.25 |
| 5,532,838 A | * | 7/1996 | Barbari | ......................... 358/400 |
| 5,552,901 A | * | 9/1996 | Kikuchi et al. | .............. 358/468 |
| 5,720,014 A | * | 2/1998 | Ikeda et al. | ................. 358/1.15 |
| 5,739,919 A | * | 4/1998 | Lee et al. | ..................... 358/407 |
| 5,798,710 A | * | 8/1998 | Yoshino et al. | ......... 340/825.52 |
| 5,835,236 A | * | 11/1998 | Barbari | ........................ 358/442 |
| 5,896,204 A | * | 4/1999 | Sato et al. | .................... 358/405 |
| 6,525,841 B1 | * | 2/2003 | Yoshida | ....................... 358/400 |
| 6,801,546 B1 | * | 10/2004 | Yoshida et al. | .............. 370/490 |
| 6,943,910 B2 | * | 9/2005 | Tanimoto | ................... 358/1.15 |
| 7,142,325 B2 | * | 11/2006 | Nagata | ....................... 358/1.18 |
| 7,151,616 B2 | * | 12/2006 | Yoshida | ..................... 358/1.15 |
| 7,230,733 B2 | * | 6/2007 | Adegawa | .................... 358/1.15 |
| 2001/0028473 A1 | * | 10/2001 | Yamasaki et al. | .......... 358/1.15 |
| 2002/0051222 A1 | * | 5/2002 | Nishimura | ................... 358/402 |
| 2002/0156798 A1 | * | 10/2002 | Larue et al. | ................. 707/201 |

FOREIGN PATENT DOCUMENTS

| | | |
|---|---|---|
| JP | 04-107062 | 4/1992 |
| JP | 05-284319 | 10/1993 |
| JP | 09-130568 | 5/1997 |
| JP | 2002-027199 | 1/2002 |

* cited by examiner

*Primary Examiner*—Edward L. Coles
*Assistant Examiner*—Negussie Worku
(74) *Attorney, Agent, or Firm*—Hogan & Hartson LLP

(57) ABSTRACT

A communication terminal device includes a first storage device storing a transmission reservation table which includes information of communication jobs to be transmitted, a second storage device storing image data to be transmitted, and a transmitter transmitting the stored image data to a destination via a communication line in accordance with the transmission reservation table. A controller adds another image data to the stored image data that is to be transmitted, in the same communication job, and stores the combined image data in the second storage device.

7 Claims, 7 Drawing Sheets

FIG. 2

TRANSMISSION RESERVATION TABLE 7a

| COMMUNICATION JOB NUMBER: 00 | STATUS: WAITING FOR RESCHEDULE |
|---|---|
| TRANSMITTER TERMINAL IDENTIFICATION PRINTING (①, 2, 3) ||
| APPLIED COMMUNICATION CLASSIFICATION (TIME DESIGNATION (TIME INFORMATION), F CODE TRANSMISSION, CONFIDENTIAL, RELAY, BOTH-SIDES COMMUNICATION) ||
| NUMBER OF DESTINATION: 075-123-4567 ||
| COMMUNICATION MODE: G3 ECM ||
| MEMORY INDEX NUMBER: 0 | ; NUMBER OF PAGES: 3 |
| COVER PAGE ( ON, (OFF) ) ||
| DELETION DATE AND TIME: 2001, 09, 28: 09:35 ||

FIG. 3

IMAGE MEMORY MANAGEMENT TABLE 7b

| INDEX NUMBER | PAGE NUMBER | HEAD ADDRESS OF IMAGE MEMORY 8 |
|---|---|---|
| 0 | 1 | 0000 |
| 0 | 2 | 01FF |
| 0 | 3 | 03AB |
| 1 | 1 | 05FF |
| ⋮ | ⋮ | ⋮ |

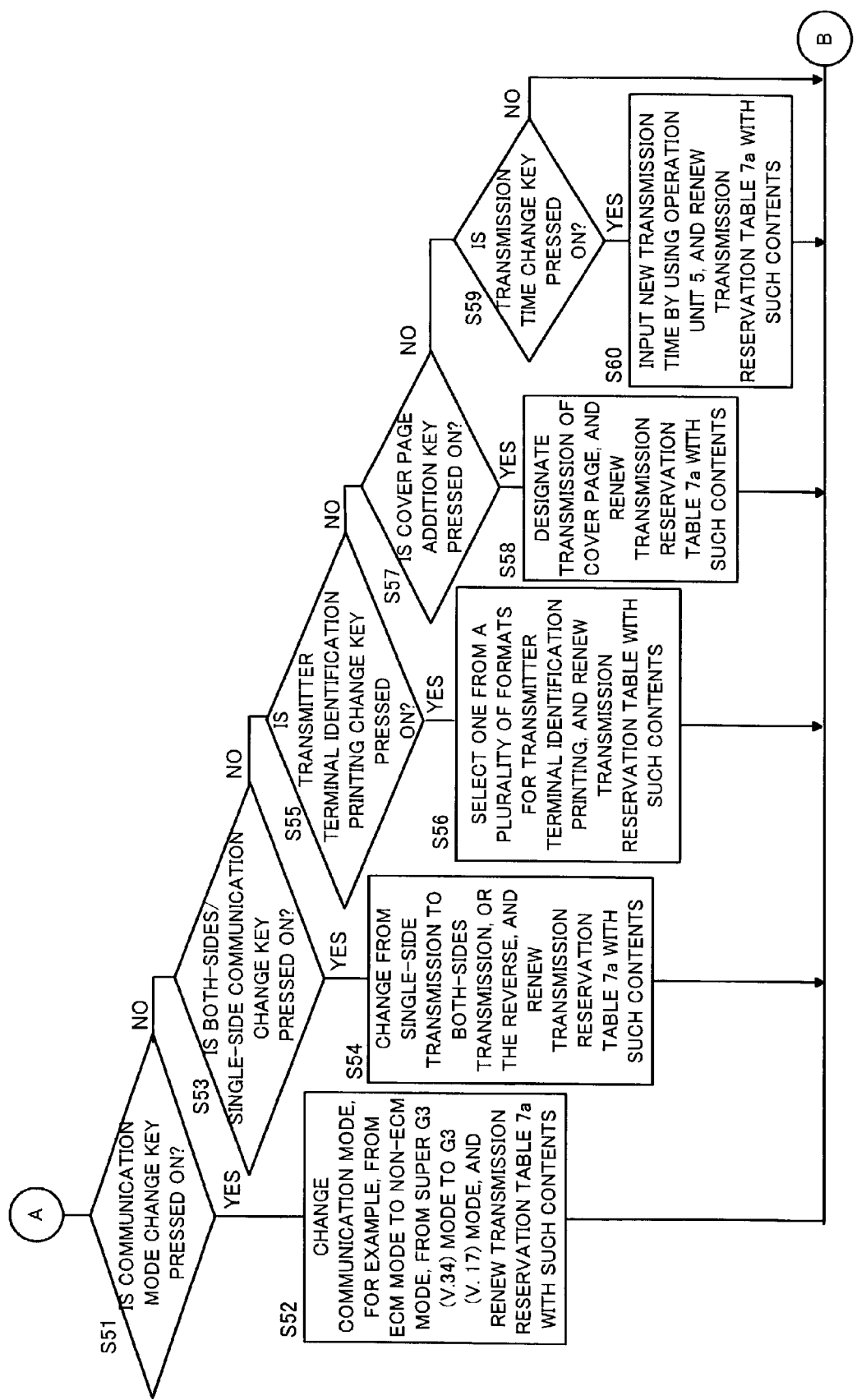

COMMUNICATION TERMINAL DEVICE

FIELD OF THE INVENTION

The present invention relates to communication terminal device such as facsimile machine, including a transmitter for transmitting image data via a communication line in accordance with a transmission reservation table.

DESCRIPTION OF THE RELATED ART

In conventional facsimile machines, a scanner scans an image of an original to be transmitted, the image is converted into an image data, and the converted image data is stored in an image memory. The information of a communication job to be transmitted is stored in a transmission reservation table, along with information such as telephone numbers and transmission times. Then, when the designated transmission time arrives, the stored corresponding image data is fetched and transmitted via the communication line such as a public telephone line, in accordance with the transmission reservation table.

However, in conventional facsimile machines, when changing the communication job of the transmission reservation within the transmission reservation table, it is necessary to delete the communication job, and then to have an original image scanned again. Therefore, addition of originals, change of communication methods, change of transmitter terminal identification printing, etc. cannot be carried out.

SUMMARY OF THE INVENTION

It is thus an advantage of the present invention to solve the above-mentioned problems, and to provide a communication terminal device such as a facsimile machine that can carry out addition of original images, change of communication methods, or change in transmitter terminal identification printing, in a communication job of transmission reservation within a transmission reservation table.

According to a first aspect of the present invention, a communication terminal device includes a first storage device for storing a transmission reservation table having information of communication jobs that are to be transmitted, a second storage device storing image data to be transmitted, and a transmitter transmitting the stored image data via a communication line in accordance with the transmission reservation table. In addition, the communication terminal device includes a controller adding another image data to the stored image data that is to be transmitted in the same communication job, and then storing the combined image data in the second storage device.

According to a second aspect of the present invention, a communication terminal device includes a first storage device storing a transmission reservation table having information of communication jobs that are to be transmitted, a second storage device storing image data to be transmitted, and a transmitter transmitting the stored image data via a communication line in accordance with the transmission reservation table. In addition, the communication terminal device includes a controller changing a communication method in the communication job within the stored transmission reservation table, to another communication method.

Furthermore, according to a third aspect of the present invention, a communication terminal device includes a storage device storing a transmission reservation table having information of communication jobs that are to be transmitted, a second storage device storing the image data to be transmitted, and a transmitter transmitting the stored image data via a communication line in accordance with the transmission reservation table. In addition, the communication terminal device includes a controller changing transmitter terminal identification printing information in the communication job within the stored transmission reservation table, to another transmitter terminal identification printing information.

BRIEF DESCRIPTION OF THE DRAWINGS

FIG. 2 is a view showing an example of a transmission reservation table 7a within RAM 7 of FIG. 1.

FIG. 3 is a view showing an example of an image memory management table 7b within the RAM 7 of FIG. 1.

FIG. 8 is a flow chart showing a second part of the edit processing (steps S22, S34) which is a subroutine of FIGS. 5 and 6.

DETAILED DESCRIPTION OF THE PREFERRED EMBODIMENTS

An embodiment of the present invention will be described in accordance with the accompanying drawings.

Figure 1:
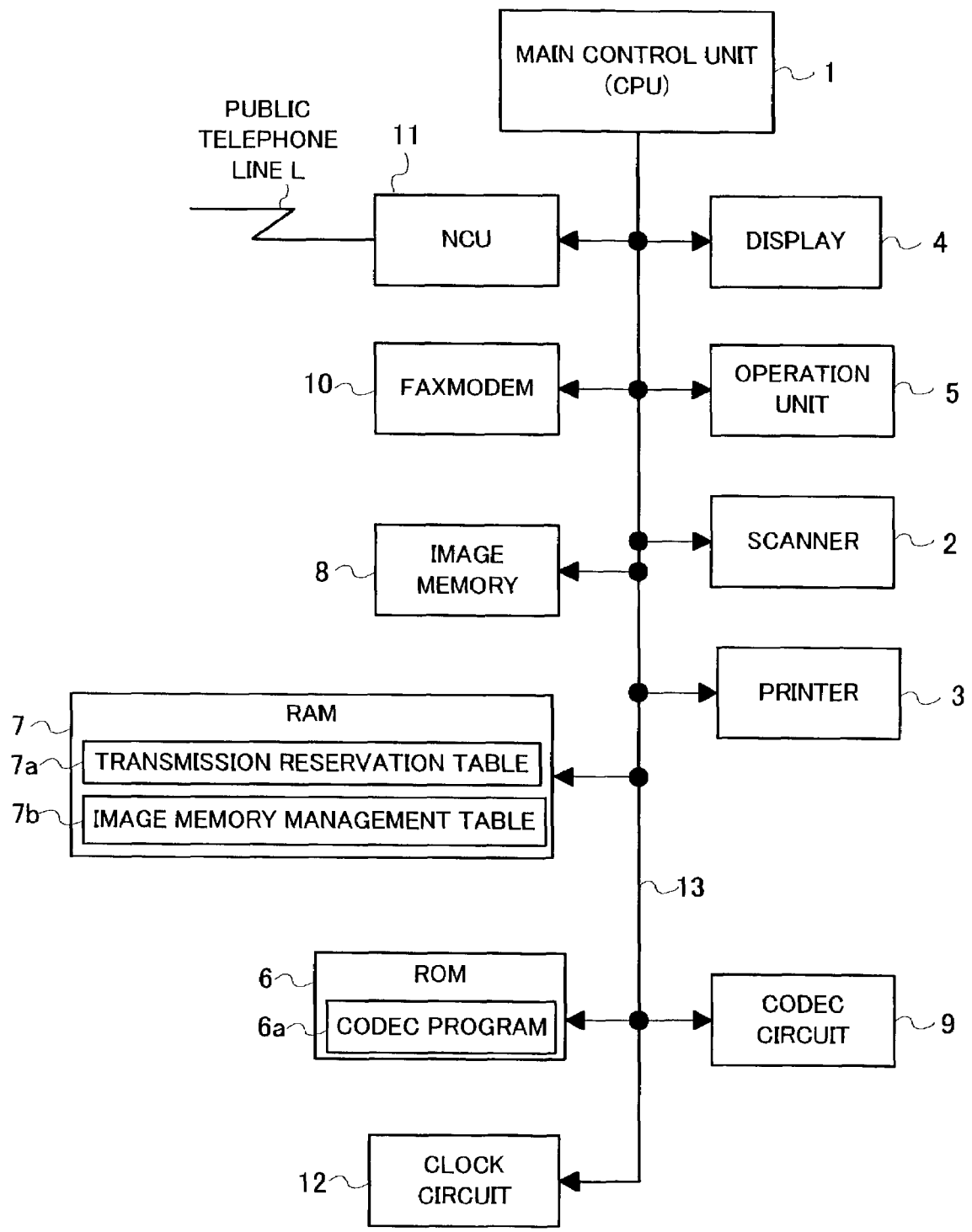
FIG. 1 is a block diagram showing a structure of a facsimile machine 20 relating to an embodiment of the present invention.

FIG. 1 is a block diagram showing a structure of a facsimile machine 20 relating to an embodiment of the present invention.

In the facsimile machine 20, a scanner 2 scans an image of an original to be transmitted, the image is converted into an image data, and the image data is stored in an image memory 8. The information about the communication job to be transmitted is stored in a transmission reservation table 7a within RAM (Random Access Memory) 7, along with telephone numbers of the receiving device, transmission time information, and the like. Then, when the designated transmission time arrives, the stored corresponding image data is fetched and transmitted to the receiving device via a public telephone line L, in accordance with the transmission reservation table 7a. The present embodiment is characterized in that a main control unit 1 carries out the following processes in edit processing (steps S22, S34) of facsimile transmission processing shown in FIG. 5 or reschedule waiting processing (interruption processing) shown in FIG. 6:

(a) When an original addition key is pressed ON (YES in step S47 in FIG. 7), the main control unit 1 adds another image data converted by the scanner 2 to the image data to be transmitted that is stored in an image memory 8 in the same communication job, and then stores the combined image data in the image memory 8 (step S48).

(b) When a communication mode changing key is pressed ON (YES in step S51 in FIG. 8), the main control unit 1 changes the communication method in the information of the communication job within the transmission reservation table 7a within the RAM 7 into another communication method (step S52).

(c) When a transmitter terminal identification printing changing key is pressed ON (YES in step S55 in FIG. 8), the main control unit 1 changes the transmitter terminal identification printing information in the information of the communication job within the transmission reservation table 7a within the RAM 7 into another transmitter terminal identification printing information (step S56).

As shown in FIG. 1, the facsimile machine 20 includes facsimile communication functions of the conventional G3 method or the like. The facsimile machine 20 also includes hardware CODEC circuit 9 having communication ability of V.34 mode of ITU-T (International Telecommunication Union) Recommendation, and CODEC program 6a within ROM (Read Only Memory) 6 having communication ability equal to or lower than V.17 mode of the ITU-T Recommendation. The main control unit 1 is formed of a CPU (central processing unit) specifically, and connected to each of the following hardware units via a bus 13. The main control unit 1 controls the hardware units, and carries out functions of various software to be mentioned later on. The scanner 2 scans the original by charged coupled device (CCD) or the like, and outputs dotted image data converted into a binary of black and white. A printer 3 is a printing device of electrophotographic type or the like. The printer 3 prints out the image data received through a facsimile communication from another facsimile machine as a hardcopy. A display 4 is a displaying device of a liquid crystal display (LCD), cathode ray tube (CRT) display, or the like. The display 4 displays operational status of the facsimile machine 20, and displays the image data of the original to be transmitted and the received image data.

An operation unit 5 includes letter keys necessary for operating the facsimile machine 20, ten-key numeric pad for dialing, speed-dial keys, one-touch dial keys, other various function keys, and the like. Further, by making the display 4 to be a touch-paneled type, a part of or all of the keys within the operation unit 5 can be shared.

The ROM 6 stores in advance various software programs, which are necessary for the operation of the facsimile machine 20, and which are to be carried out by the main control unit 1. The programs have communication ability based on V.17 mode, V.32, V.27ter, V.26bis, etc. of the ITU-T Recommendation. In addition, the programs include CODEC program 6a for carrying out encoding and decoding of the image data, and programs for communication job registration processing shown in FIG. 4, facsimile transmission processing shown in FIG. 5, reschedule waiting processing (interruption processing) shown in FIG. 6, and edit processing shown in FIGS. 7 and 8 which is a subroutine. The RAM 7 is formed of SRAM (Static Random Access Memory), a flash memory, or the like. The RAM 7 is used as a working area of the main control unit 1, and stores temporary data generating when the programs are carried out. The RAM 7 stores a transmission reservation table 7a and an image memory management table 7b, which are to be described later on respectively. Further, in the case a flash memory is used for the RAM 7, even when power source is shut due to power failure, transferring of the machine, and the like, the contents of the data are not lost. The image memory 8 is formed of DRAM (Dynamic Random Access Memory) or the like, and stores the image data to be transmitted or the received image data. Further, the RAM 7 and the image memory 8 can be formed by a hard disk memory.

A faxmodem 10 is connected to the public telephone line L. The faxmodem 10 is a modem having functions of the faxmodem for normal facsimile communication. A network control unit (NCU) 11 is a hardware circuit for closing and opening a current loop or the like of an analogue public telephone line L, having autodial function. The NCU 11 connects the faxmodem 10 to the public telephone line L when necessary. The NCU 11 can detect ID receiving terminal activation signal of caller ID notification service, and the general telephone calling signal. In addition, the NCU 11 can transmit a first response signal and a second response signal of the caller ID notification service when necessary. Further, the NCU 11 can be connected to a digital network of a base band transmission method (for example, ISDN line) via a prescribed terminal adaptor and DSU (Digital Service Unit).

Furthermore, a clock circuit 12 times present date and time. In response to a demand signal from the main control unit 1, the clock circuit 12 outputs the information of the present date and time to the main control unit 1.

The facsimile machine 20 of the present embodiment constructed likewise includes the CODEC circuit 9 and the CODEC program 6a, in addition to the facsimile communication functions of the general G3 method or the like. In the facsimile communication function, the CODEC program 6a within the ROM 6 or the CODEC circuit 9 encodes the dotted image data scanned by the scanner 2, in accordance with encoding methods such as MH (Modified Huffman), MR (Modified Read), MMR (Modified Modified Read) or the like, which are defined in the standard of the facsimile communication. Then, the encoded image data is transmitted to the facsimile machine of the receiving device. At the same time, the encoded data received from the facsimile machine of the receiving device is decoded into an image data by the CODEC program 6a within the ROM 6 or by the CODEC circuit 9. Then, the encoded data is output as a hardcopy from the printer 3. Further, the image memory 8 stores the image data when necessary, and also outputs the stored image data when necessary.

In addition, the communication procedure of V.34 mode and V.8 mode, which are capable of high-speed data communication, such as facsimile communication, will be described. In the case of carrying out data communication by the communication terminal device such as a facsimile machine, a modem of a half duplex method is used. Such a modem is based on communication procedure of V.17 mode of ITU-T Recommendation or the like. The data communication is carried out in accordance with a procedure defined in T. 30 of the ITU-T Recommendation, which is also the facsimile communication procedure of G3 standard. In addition, an ultra-high-speed communication procedure, which is based on V.34 of the ITU-T Recommendation and which the maximum transmitting speed is 33.6 kbps (hereinafter referred to as the communication procedure of V.34 mode), is also put into practical use. Under the communication procedure of V.34 mode, at the start of the communication and during the communication, the communication speed can be designated at the receiving side in accordance with the condition of the communication line at that time, specifically, S/N (signal-to-noise ratio), and the bandwidth. The transmitting side changes the communication speed for carrying out the transmission under the communication speed designed at the receiving side in such a manner. Further, in the case of carrying out data communication by the communication procedure of V.34 mode, the above procedure is carried out by the V.8 communication procedure of the ITU-T Recommendation, and the actual communication speed is designated.

The faxmodem 10 to be used in the present embodiment is a modem that is capable of communication procedure of V.34 mode. The faxmodem 10 can change the communication speed during the communication. In addition, the faxmodem 10 can monitor from outside, the condition of the communication line at that time, specifically, S/N, and data of bandwidth, as a status in accordance with the signal received from the other end of the communication. In other words, a line probing processing is carried out with a machine at the transmitting side. As a result of such a processing, the S/N and the bandwidth of the line at that time is output as a status from the faxmodem 10, and the main control unit 1 fetches the status to carry out a processing based on the status.

FIG. 2 shows an example of the transmission reservation table 7a within the RAM 7 of FIG. 1. As shown in FIG. 2, the following information is stored in the transmission reservation table 7a for each communication job:
(1) communication job number,
(2) status: waiting for reschedule, waiting for immediate transmission (if the line is free, transmit immediately), time designated transmission, etc.,
(3) transmitter terminal identification printing: select a format of the transmitter terminal identification printing to be written in the header of a facsimile,
(4) applied communication classification: time designation (including time information), designation of F-code transmission, confidential, relay, both-sides communication, etc.,
(5) number of destination,
(6) communication mode: designation of G3 or G4, ECM (Error Correction Mode) or non-ECM, modem communication mode, communication speed, etc.,
(7) memory index number: so-called index file number in image memory,
(8) number of pages,
(9) cover page: designate whether or not to attach a cover page of so-called transmission communication card before the image data of an original to be transmitted,
(10) deletion date and time: when reschedule is to be waited, for example, set a time 72 hours later from that time, and automatically delete the communication job and the image data.

FIG. 3 shows an example of the image memory management table 7b within the RAM 7 of FIG. 1. As shown in FIG. 3, the head address of image memory 8, which stores the image data, is stored in the image memory management table 7b for each page number of index number.

Figure 4:
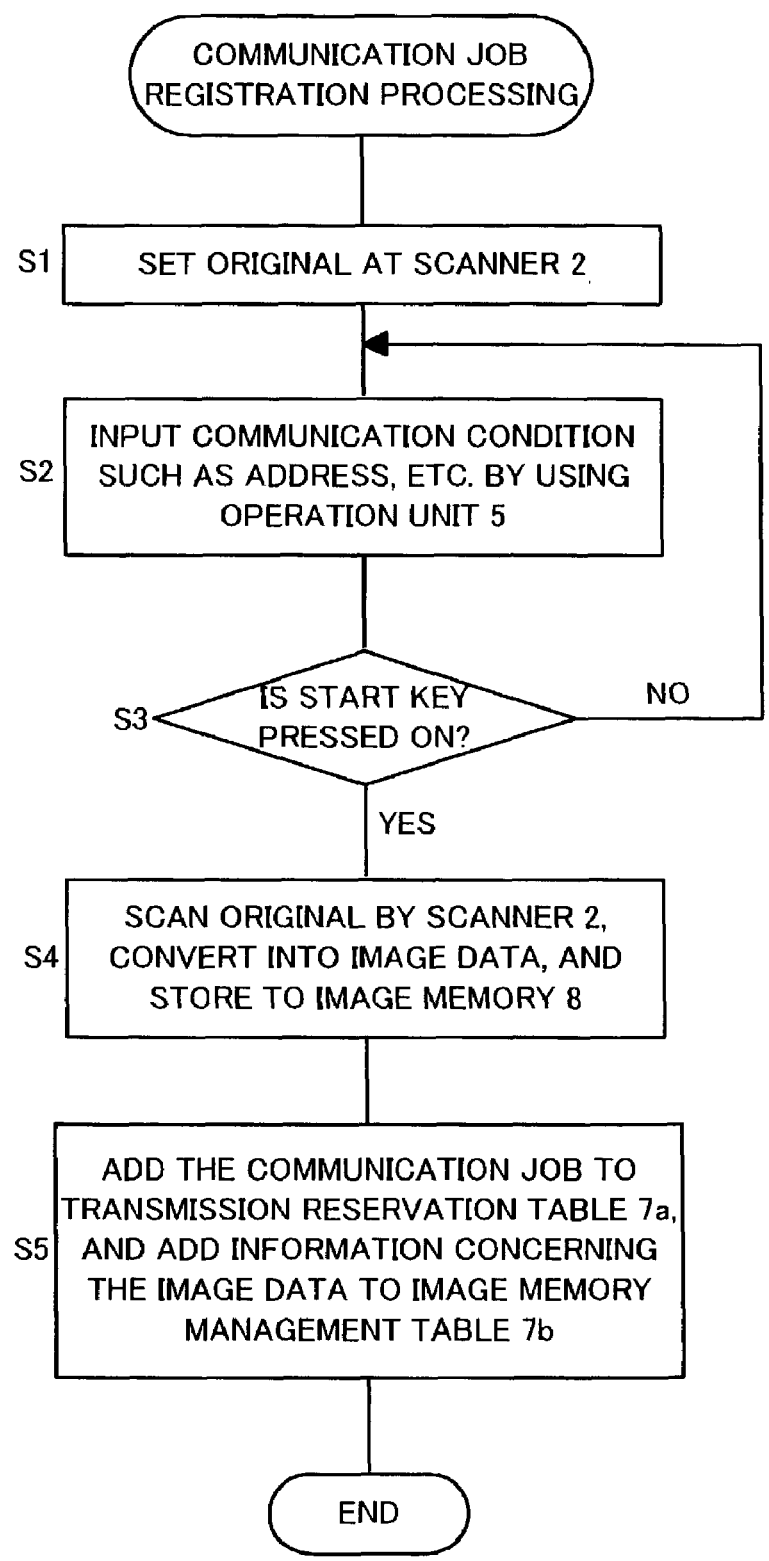
FIG. 4 is a flow chart showing communication job registration processing to be executed by a main control unit 1 of FIG. 1.

FIG. 4 is a flow chart showing communication job registration processing to be executed by the main control unit 1 of FIG. 1.

Referring to FIG. 4, first, an original is set at the scanner 2 in step S1. Then, the communication condition such as an address, etc. is input by using the operation unit 5 in step S2. Then, it is determined whether or not the start key is pressed ON in step S3. When NO is selected in the step S3, it returns to the step S2. When YES is selected in the step S3, it proceeds to step S4. Next, the scanner 2 scans the original, the scanned original is converted into an image data, and the image data is stored to the image memory 8 in step S4. Then, in step S5, the communication job is added to the transmission reservation table 7a, the information relating to the image data is added to the image memory management table 7b, and the communication job registering process is ended.

Figure 5:
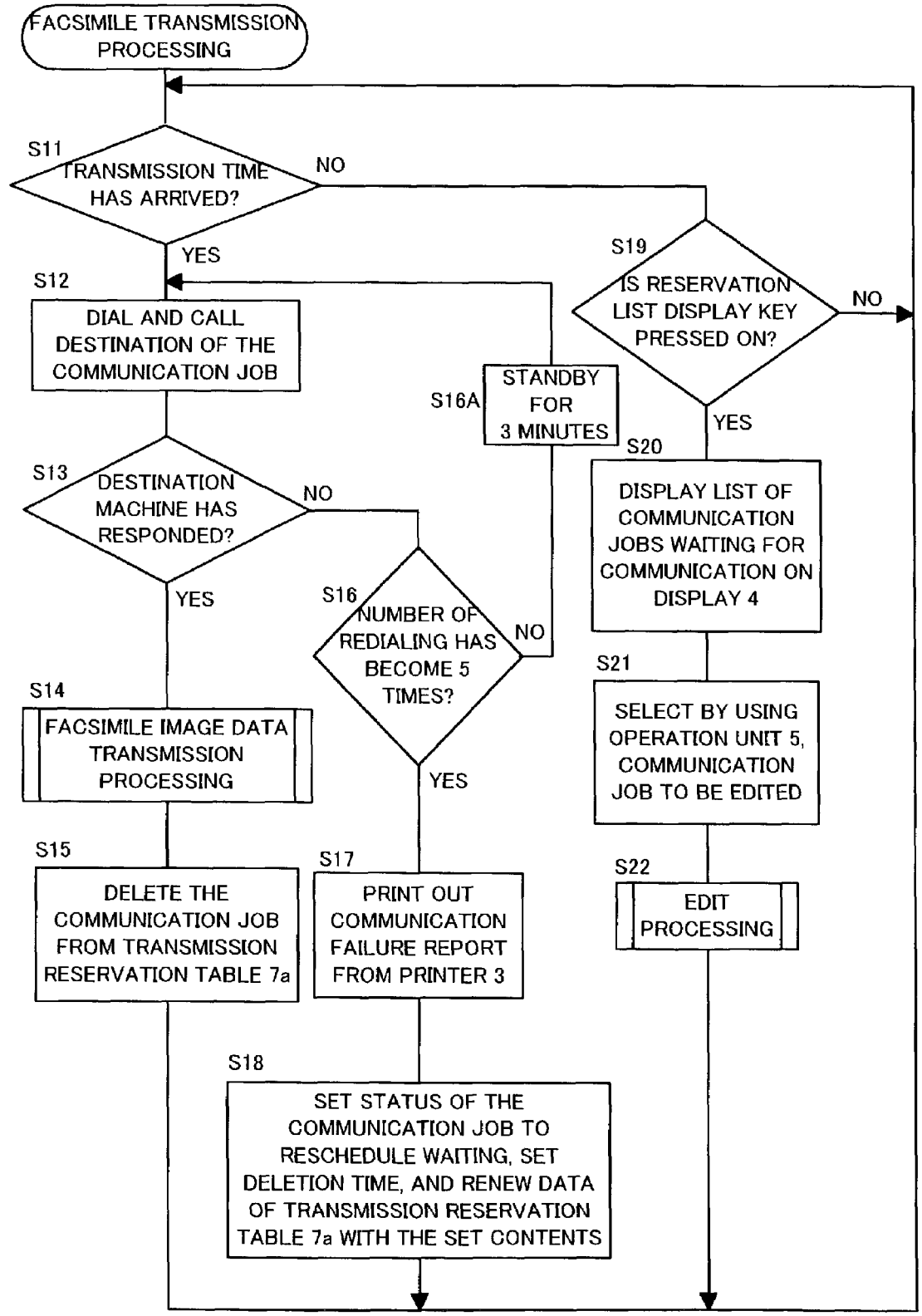
FIG. 5 is a flow chart showing facsimile transmission processing to be executed by the main control unit 1 of FIG. 1.

FIG. 5 is a flow chart showing facsimile transmission processing to be executed by the main control unit 1 of FIG. 1.

Referring to FIG. 5, first, it is determined whether or not the transmission time has arrived in step S11. When YES is selected in the step S11, it proceeds to step S12. When NO is selected, it proceeds to step S19. In step S12, the destination of the communication job is dialed and called. In step S13, it is determined whether or not the destination machine has responded. When YES is selected in the step S13, it proceeds to step S14. When NO is selected, it proceeds to step S16. In step S14, the facsimile image data transmission processing is carried out for the communication job. When such a processing is completed, the communication job is deleted from the transmission reservation table 7a in step S15, and it returns to the step S11.

When NO is selected in the step S13, it is determined whether or not the number of times of redialing has reached 5 times in step S16. When NO is selected, it waits for 3 minutes in step S16A, and then it returns to the step S12. Meanwhile, when YES is selected in the step S16, it proceeds to step S17, and a communication failure report is printed out from the printer 3. In step S18, a status of the communication job is set to reschedule waiting, the deletion time is set, and the data of the transmission reservation table 7a is renewed with the set contents. Then, it returns to step S11.

Figure 7:
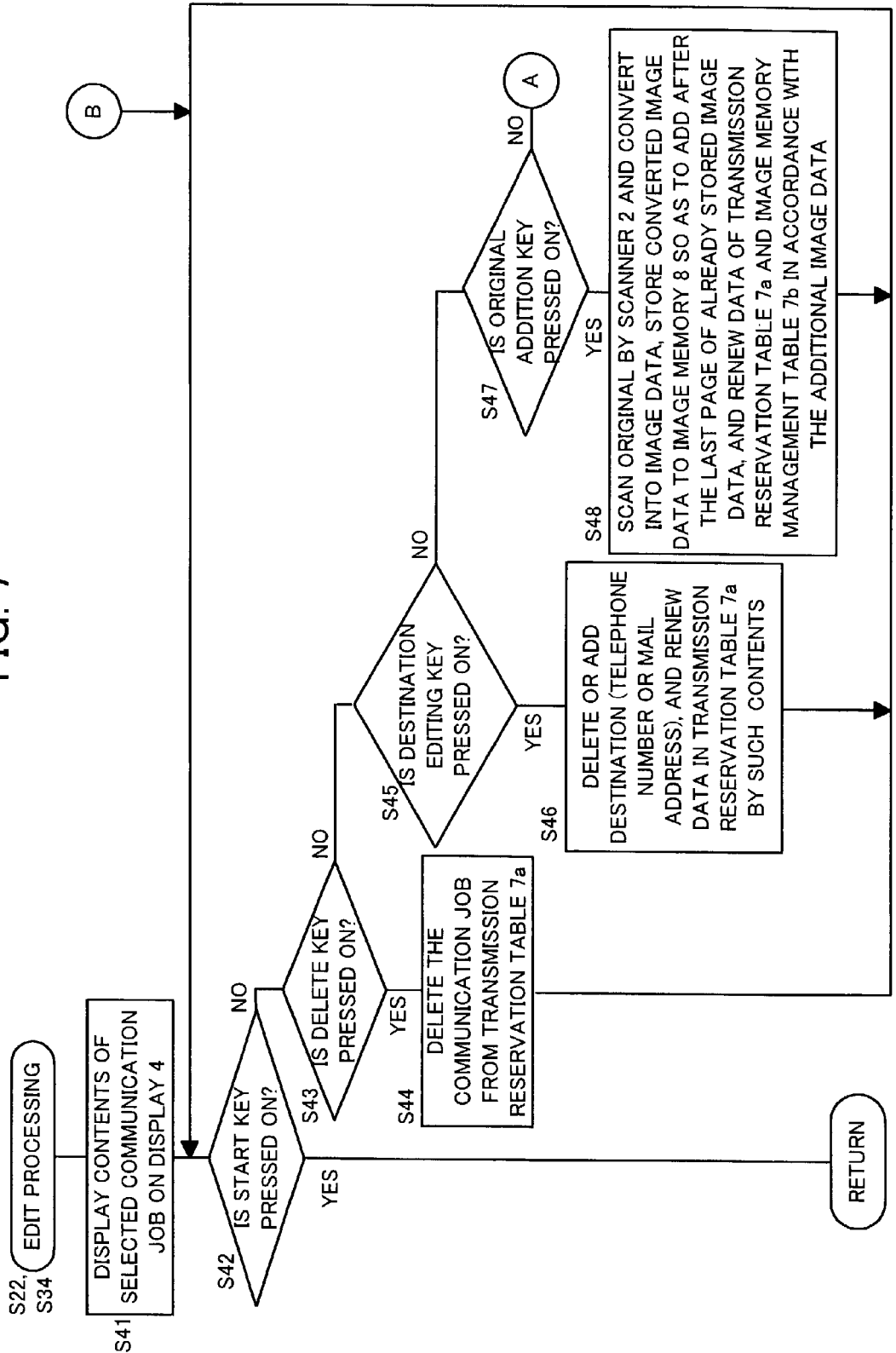
FIG. 7 is a flow chart showing a first part of edit processing (steps S22, S34) which is a subroutine of FIGS. 5 and 6.

When NO is selected in the step S11, it is determined whether or not a reservation list display key is pressed ON in step S19. When NO is selected, it returns to the step S11, and when YES is selected, it proceeds to step S20. In the step S20, a list of communication jobs waiting for communication is displayed on the display 4. In step S21, a communication job to be edited is selected by using the operation unit 5. In step S22, an edit processing, which is a subroutine of FIG. 7 and FIG. 8, is executed. Then, it returns to the step S11.

Figure 6:
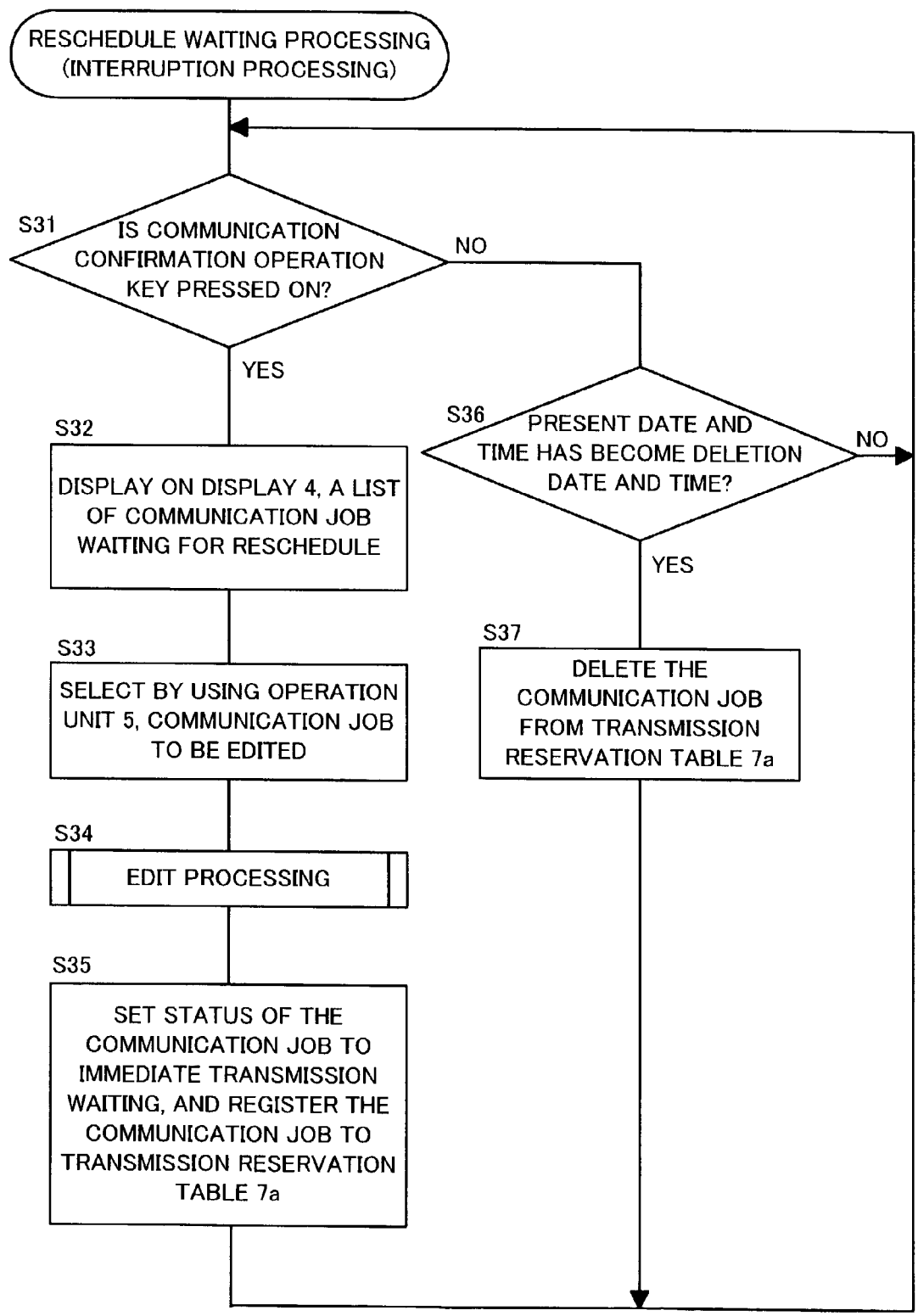
FIG. 6 is a flow chart showing reschedule waiting processing (interruption processing) to be executed by the main control unit 1 of FIG. 1.

FIG. 6 is a flow chart showing reschedule waiting processing to be carried out by an interruption processing by the main control unit 1 of FIG. 1.

Referring to FIG. 6, first in step S31, it is determined whether or not a communication confirmation operation key is pressed ON. When YES is selected, it proceeds to step S32, and when NO is selected, it proceeds to step S36. In step S32, a list of communication jobs waiting for rescheduling is displayed on the display 4. In step S33, the communication job to be edited is selected by using the operation unit 5. In step S34, the edit processing, which is a subroutine of FIG. 7 and FIG. 8, is carried out, and it proceeds to step S35. Next, in step S35, a status of the communication is set to immediate transmission waiting, the communication job is registered to the transmission reservation table 7a, and it returns to step S31. Meanwhile, in step S36, it is determined whether or not the present date and time has become the deletion date and time. When NO is selected, it returns to the step S31. When YES is selected, it proceeds to step S37, the corresponding communication job is deleted from the communication reservation table 7a, and it returns to the step S31.

FIG. 7 and FIG. 8 are flow charts showing the edit processing (steps S22, S34), which is a subroutine of FIG. 5 and FIG. 6.

Referring to FIG. 7, in step S41, the contents of the communication job (the communication job number, the status, the destination number, etc., in the information within the transmission reservation table 7a) selected in advance is displayed on the display 4. In step S42, it is determined whether or not the start key is pressed ON. When YES is selected, it returns to the original routine, and when NO is selected, it proceeds to step S43. Next, in step S43, it is determined whether or not the delete key is pressed ON. When NO is selected, it proceeds to step S45, and when YES is selected, it proceeds to step S44. In step S44, the communication job is deleted from the transmission reservation table 7a, and it returns to step S42. Furthermore, in step S45, it is determined whether or not the destination editing key is pressed ON. When NO is selected, it proceeds to step S47, and when YES is selected, is proceeds to step S46. In the step S46, the destination (telephone number or mail address in the case the facsimile machine 20 is formed as an Internet facsimile machine that can carry out facsimile communication via Internet under well-known communication procedure) is deleted or added by using the operation unit 5, and the data within the transmission reservation table 7a is renewed with such contents. Then, it returns to the step S42. Furthermore, in step S47, it is determined whether or not an original additional key is pressed ON. When NO is selected, it proceeds to step S51 shown in FIG. 8, and when YES is selected, it proceeds to step S48. In the step S48, the original is scanned by the scanner 2 and converted into image data, the converted image data is stored to the image memory 8 so as to be added after the last page of the image data of the communication job that is already stored in the image memory 8, as a communication job same as the communication job that is already stored. In addition, the data within the transmission reservation table 7a and the image memory management table 7b are renewed in accordance with the additional image data. Then, it returns to the step S42.

Referring to FIG. 8, in step S51, it is determined whether or not a communication mode change key is pressed ON. When NO is selected, it proceeds to step S53, and when YES is selected, it proceeds to step S52. In the step S52, the communication mode is changed. For example, the communication mode is changed from ECM mode to non-ECM mode, or from super G3 (V.34) mode to G3 (V.17) mode. Then, the data within the transmission reservation table 7a is renewed with such contents, and it returns to the step S42 shown in FIG. 7. Next, in step S53, it is determined whether or not both-side/single-side communication change key is pressed ON. When NO is selected, it proceeds to step S55, and when YES is selected, it proceeds to step S54. In the step S54, a change is made from single-side transmission to both-sides transmission, or a change is made from the both-side transmission to the single-side transmission. The data within the transmission reservation table 7a is renewed with such contents, and it returns to step S42 shown in FIG. 7. Furthermore, in step S55, it is determined whether or not the transmitter terminal identification printing change key is pressed ON. When NO is selected, it proceeds to step S57, and when YES is selected, it proceeds to step S56. In the step S56, one format is selected from a plurality of formats of transmitter terminal identification printing, and the data within the transmission reservation table 7a is renewed with such contents. Then, it returns to the step S42 shown in FIG. 7.

In the step S57, it is determined whether or not a cover page addition key is pressed ON. When NO is selected, it proceeds to step S59, and when YES is selected, it proceeds to step S58. In the step S58, the transmission of the cover page is designated, and the data within the transmission reservation table 7a is renewed with such contents. Then, it returns to the step S42 shown in FIG. 7. Furthermore, in step S59, it is determined whether or not a transmission time setting key is pressed ON. When NO is selected, it returns to the step S42 shown in FIG. 7, and when YES is selected, it proceeds to step S60. In the step S60, a new transmission time is input by using the operation unit 5, the data within the transmission reservation table 7a is renewed with such contents, and it returns to the step S42 shown in FIG. 7. Further, the deletion date and time in the transmission reservation table 7a can be made changeable by using the operation unit 5.

As described above, according to an embodiment of the present invention, in the edit processing (steps S22, S34) to be carried out in the facsimile transmission processing shown in FIG. 5 or in the reschedule waiting processing shown in FIG. 6, when the original addition key is pressed ON (YES in step S47 shown in FIG. 7), the main control unit 1 controls to add another image data converted by the scanner 2 to the image data stored in the image memory 8 that is to be transmitted as the same communication job, and to store the another image data into the image memory 8 (step S48). Therefore, since another image data can be added as the image data for transmission without carrying out scanning operation again after deleting the image data stored in the image memory 8, useless operation is not necessary to be carried out, and the operationality can be improved.

In addition, in the edit processing (steps S22, S34) to be carried out in the facsimile transmission processing shown in FIG. 5 or in the reschedule waiting processing shown in FIG. 6, when the communication mode change key is pressed ON (YES in step S51 shown in FIG. 8), the main control unit 1 controls to change the communication method into a different communication method among the information of the communication job within the transmission reservation table 7a within the RAM 7 (step S52). Therefore, since the communication method can be changed, for example, from ECM communication mode to non-ECM communication mode (normal G3 communication (valid when error occurs in communication)), without carrying out scanning operation again after deleting the image data stored in the image memory 8, useless operation is not necessary to be carried out, and the operationality can be improved.

In the above-described embodiment, an example of the facsimile machine 20 is described. However, the present invention shall not be limited to the facsimile machine, and the present invention can be applied to communication terminal devices including telephone sets, data communication devices or the like, which are connected to public network such as a public telephone line or public digital network.

As described above, the communication terminal device according to the present invention includes a first storage device storing a transmission reservation table having information of communication jobs that are to be transmitted, a second storage device storing the image data to be transmitted, and a transmitter transmitting the stored image data to a receiving device via a communication line in accordance with the transmission reservation table. In addition, the communication terminal device includes a controller adding another image data to the stored image data that is to be transmitted in the same communication job and storing the combined image data in the second storage device. Therefore, since another image data can be added as an image data for transmission without carrying out a scanning operation again after deleting the image data stored in the second storage device, useless operation is not necessary to be carried out, and the operationality can be improved.

In addition, the communication terminal device according to another embodiment of the present invention includes a first storage device storing a transmission reservation table having information of communication jobs that are to be transmitted, a second storage device storing the image data to be transmitted, and a transmitter transmitting the stored image data to a receiving device via a communication line in accordance with the transmission reservation table. In addition, the communication terminal device includes a controller changing the communication method to another communication method in the information of the communication job within the stored transmission reservation table. Therefore, since the communication method can be changed, for example, from the ECM communication mode to the non-ECM communication mode without carrying out another scanning operation after deleting the image data stored in the second storage device, useless operation is not necessary to be carried out, and the operationality can be improved.

Furthermore, the communication terminal device according to another embodiment of the present invention includes a storage device storing a transmission reservation table having information of communication jobs that are to be transmitted, a second storage device storing the image data to be transmitted, and a transmitter transmitting the stored image data receiving device via a communication line in accordance with the transmission reservation table. In addition, the communication terminal device includes a controller changing transmitter terminal identification printing information to another transmitter terminal identification printing information in the information of the communication job within the stored transmission reservation table. Therefore, since information of transmitter terminal identification printing can be changed without carrying out another scanning operation after deleting the image data stored in the second storage device, useless operation is not necessary to be carried out, and the operationality can be improved.

What is claimed is:

1. A communication terminal device comprising:
   a first storage device storing a transmission reservation table which includes information of communication jobs to be transmitted;
   a second storage device storing image data to be transmitted in accordance with the transmission reservation table of the first storage device;
   a transmitter transmitting the stored image data to a destination via a communication line in accordance with the transmission reservation table; and
   an operation unit receives a first input changing a communication method to another communication method in a communication job within the stored transmission reservation table inputted before transmitting the image data,
   wherein the communication method is setting a deletion date and time of both the communication job and image data based on a first rescheduled transmission time,
   wherein the operation unit receives a second input after failed image data transmission, the second input changing the first rescheduled transmission time to a second rescheduled transmission time,
   wherein the second rescheduled transmission time is input as the second input to the operation unit after failed transmission at the first rescheduled transmission time.

2. The communication terminal device according to claim 1, wherein the communication method is a change from an ECM communication to a non-ECM communication.

3. The communication terminal device according to claim 1, wherein the communication method is a change from a method using a V.34 protocol to a method using a V.17 standard.

4. The communication terminal device according to claim 1, wherein the communication method is a change in communication speed.

5. The communication terminal device according to claim 1, wherein the communication method is a change from a single-sided communication to a double-sided communication.

6. A communication terminal device comprising:
   a first storage device storing a transmission reservation table which includes information of communication jobs to be transmitted;
   a second storage device storing image data to be transmitted in accordance with the transmission reservation table of the first storage device;
   a transmitter transmitting the stored image data to a destination via a communication line in accordance with the transmission reservation table; and
   an operation unit changing transmitter terminal identification printing information to another transmitter terminal identification printing information in the information of the communication job within the stored transmission reservation table before transmitting the image data,
   wherein the transmitter terminal identification printing information changed by the operation unit is written into a header of the transmitted image data and identifies a transmitter terminal.

7. A communication terminal device comprising:
   a first storage device storing a transmission reservation table which includes information of communication jobs to be transmitted;
   a second storage device storing image data to be transmitted in accordance with the transmission reservation table of the first storage device;
   a transmitter transmitting the stored image data to a destination via a communication line in accordance with the transmission reservation table; and
   an operation unit adding a cover page in the information of a communication job within the stored transmission reservation table before transmitting the image data appended with the cover page while maintaining a same communication method.

* * * * *